US012794305B2

(12) United States Patent
Arroyo Castilleja et al.

(10) Patent No.: US 12,794,305 B2
(45) Date of Patent: Nov. 10, 2026

(54) BRUSHLESS MOTOR

(71) Applicant: Dyson Technology Limited, Wiltshire (GB)

(72) Inventors: Antonio Jose Arroyo Castilleja, Bath (GB); Thomas Edward Halhead, Bristol (GB); Roberto Faventi, Swindon (GB); Michael Chung Kau Liu, Swindon (GB); Jamie Lee Tyler, Swindon (GB); Japhet Lee Cordova Morabe, Singapore (SG); Thomas Richard Stafford, Bath (GB)

(73) Assignee: Dyson Technology Limited, Malmesbury (GB)

( * ) Notice: Subject to any disclaimer, the term of this patent is extended or adjusted under 35 U.S.C. 154(b) by 198 days.

(21) Appl. No.: 18/578,476

(22) PCT Filed: Jul. 12, 2022

(86) PCT No.: PCT/GB2022/051803
§ 371 (c)(1),
(2) Date: Jan. 11, 2024

(87) PCT Pub. No.: WO2023/285808
PCT Pub. Date: Jan. 19, 2023

(65) Prior Publication Data

US 2024/0297548 A1 Sep. 5, 2024

(30) Foreign Application Priority Data

Jul. 13, 2021 (GB) ..................................... 2110085

(51) Int. Cl.
*H02K 5/173* (2006.01)
*A47L 5/24* (2006.01)
(Continued)

(52) U.S. Cl.
CPC .............. *H02K 5/1732* (2013.01); *A47L 5/24* (2013.01); *F16C 19/08* (2013.01); *H02K 3/522* (2013.01);
(Continued)

(58) Field of Classification Search
CPC ...... H02K 5/1732; H02K 3/522; H02K 7/083; H02K 21/16; H02K 2203/12; A47L 5/24; F16C 19/08; F16C 2380/26
See application file for complete search history.

(56) References Cited

U.S. PATENT DOCUMENTS 2,506,404 A 5/1950 Woodfield et al.
2,926,051 A 2/1960 Cazier et al.
(Continued)

FOREIGN PATENT DOCUMENTS

CN 204145092 U 2/2015
CN 205195452 U 4/2016
(Continued)

OTHER PUBLICATIONS

International Search Report and Written Opinion received for PCT Patent Application No. PCT/GB2022/051801, mailed on Oct. 17, 2022, 10 pages.
(Continued)

*Primary Examiner* — Terrance L Kenerly
(74) *Attorney, Agent, or Firm* — Tucker Ellis LLP; Michael G. Craig

(57) ABSTRACT

A brushless motor having a stator assembly, a rotor assembly rotatable relative to the stator assembly, and a frame within which the stator assembly and the rotor assembly are housed. The rotor assembly includes a shaft, first and second bearings attached to the shaft, and a permanent magnet attached to the shaft between the first and second bearings. The rotor assembly includes an impeller attached to the
(Continued)

shaft, with the first bearing located further away from the impeller than the second bearing. The rotor assembly includes an o-ring mounted between the first bearing and the frame.

21 Claims, 12 Drawing Sheets

(51) Int. Cl.
*F16C 19/08* (2006.01)
*H02K 3/52* (2006.01)
*H02K 7/08* (2006.01)
*H02K 21/16* (2006.01)

(52) U.S. Cl.
CPC ............ *H02K 7/083* (2013.01); *H02K 21/16* (2013.01); *F16C 2380/26* (2013.01); *H02K 2203/12* (2013.01)

(56) References Cited

U.S. PATENT DOCUMENTS

| | | | |
|---|---|---|---|
| 3,145,317 | A | 8/1964 | Blohm et al. |
| 3,435,930 | A | 4/1969 | Scheuerer |
| 4,219,330 | A | 8/1980 | Jaremus |
| 4,486,055 | A | 12/1984 | Rohloff |
| 4,645,361 | A | 2/1987 | Lakin |
| 4,981,390 | A | 1/1991 | Cramer et al. |
| 5,059,042 | A | 10/1991 | Grierson |
| 5,134,327 | A | 7/1992 | Sumi et al. |
| 5,268,607 | A | 12/1993 | Mcmanus |
| 5,293,665 | A | 3/1994 | Worwag |
| 5,829,891 | A | 11/1998 | Beaman |
| 6,002,185 | A | 12/1999 | Nakao et al. |
| 6,166,468 | A | 12/2000 | Suzuki et al. |
| 6,849,977 | B2 | 2/2005 | Walther et al. |
| 6,903,475 | B2 | 6/2005 | Ortt et al. |
| 6,910,654 | B2 | 6/2005 | Kawano et al. |
| 7,036,206 | B2 | 5/2006 | Worden et al. |
| 7,049,715 | B2 | 5/2006 | Neal |
| 7,067,952 | B2 | 6/2006 | Neal |
| 7,487,570 | B2 | 2/2009 | Kim et al. |
| 7,588,444 | B2 | 9/2009 | Kataoka et al. |
| 7,604,414 | B2 | 10/2009 | Verhoeven |
| 7,800,265 | B2 | 9/2010 | Nishikawa et al. |
| 7,868,726 | B2 | 1/2011 | Asano |
| 8,058,766 | B2 | 11/2011 | Hoshino et al. |
| 8,368,261 | B2 | 2/2013 | Ishizue et al. |
| 8,368,262 | B2 | 2/2013 | Ishizue et al. |
| 8,459,875 | B2 | 6/2013 | Otsuka |
| 8,513,843 | B2 | 8/2013 | Kinugawa |
| 8,536,744 | B2 | 9/2013 | Nagayama et al. |
| 8,636,479 | B2 | 1/2014 | Kenyon et al. |
| 8,845,202 | B2 | 9/2014 | Teimel |
| 9,054,563 | B2 | 6/2015 | Matsunaga et al. |
| 9,263,919 | B2 | 2/2016 | King et al. |
| 9,293,966 | B2 | 3/2016 | Marioni |
| 9,337,696 | B2 | 5/2016 | Funakoshi et al. |
| 9,391,493 | B2 | 7/2016 | Leung et al. |
| 9,601,966 | B2 | 3/2017 | Furukawa et al. |
| 9,614,403 | B2 | 4/2017 | Yoshida et al. |
| 9,702,403 | B2 | 7/2017 | Beck et al. |
| 9,812,920 | B2 | 11/2017 | Mckinzie et al. |
| 10,186,916 | B2 | 1/2019 | Asakura et al. |
| 10,456,000 | B2 | 10/2019 | Rukavina |
| 10,811,925 | B2 | 10/2020 | Hnni et al. |
| 11,482,913 | B2 | 10/2022 | Sumi |
| 2004/0051417 | A1 | 3/2004 | Yamazaki et al. |
| 2004/0056537 | A1 | 3/2004 | Du et al. |
| 2004/0070289 | A1 | 4/2004 | Worden et al. |
| 2004/0134708 | A1 | 7/2004 | Tanaka et al. |
| 2005/0093379 | A1 | 5/2005 | Tanabe et al. |
| 2006/0181168 | A1 | 8/2006 | Hargraves et al. |
| 2007/0230839 | A1 | 10/2007 | Childe et al. |
| 2008/0084131 | A1 | 4/2008 | Yamawaki et al. |
| 2009/0080823 | A1 | 3/2009 | Bauch et al. |
| 2009/0119871 | A1 | 5/2009 | Dilger et al. |
| 2009/0167101 | A1 | 7/2009 | Saga et al. |
| 2010/0156231 | A1 | 6/2010 | Lee et al. |
| 2011/0187221 | A1 | 8/2011 | Dreisbach |
| 2012/0007453 | A1 | 1/2012 | Leiber et al. |
| 2012/0019080 | A1 | 1/2012 | Kottmyer et al. |
| 2013/0020885 | A1 | 1/2013 | Hsieh et al. |
| 2013/0038146 | A1 | 2/2013 | Hofmann et al. |
| 2013/0052051 | A1 | 2/2013 | Clothier et al. |
| 2013/0221889 | A1 | 8/2013 | Kim et al. |
| 2013/0229071 | A1 | 9/2013 | Lau et al. |
| 2013/0263439 | A1 | 10/2013 | Brandau et al. |
| 2014/0271280 | A1 | 9/2014 | Ley et al. |
| 2014/0319955 | A1 | 10/2014 | Leaver et al. |
| 2014/0328674 | A1 | 11/2014 | Jacob et al. |
| 2014/0341759 | A1 | 11/2014 | Calico et al. |
| 2015/0040707 | A1 | 2/2015 | Hong |
| 2015/0219149 | A1 | 8/2015 | Teimel |
| 2015/0379897 | A1 | 12/2015 | Nadig et al. |
| 2016/0285339 | A1 | 9/2016 | Smith et al. |
| 2017/0093252 | A1 | 3/2017 | Otsubo |
| 2017/0159707 | A1 | 6/2017 | Yamawaki et al. |
| 2017/0170693 | A1 | 6/2017 | Dymond et al. |
| 2017/0256995 | A1 | 9/2017 | Lam et al. |
| 2017/0338713 | A1 | 11/2017 | Tomizawa et al. |
| 2018/0163747 | A1 | 6/2018 | Hayamitsu et al. |
| 2018/0266440 | A1 | 9/2018 | Shiozawa |
| 2018/0303578 | A1 | 10/2018 | Bierbaum et al. |
| 2018/0351430 | A1 | 12/2018 | Inada et al. |
| 2018/0363669 | A1* | 12/2018 | Sullivan ................ H02K 7/083 |
| 2018/0375400 | A1 | 12/2018 | Ahrens et al. |
| 2019/0115807 | A1 | 4/2019 | Wells |
| 2019/0157922 | A1 | 5/2019 | Tangudu et al. |
| 2019/0165642 | A1 | 5/2019 | Kajikawa et al. |
| 2020/0119599 | A1 | 4/2020 | Tanabe et al. |
| 2020/0204032 | A1 | 6/2020 | Zhong et al. |
| 2021/0207617 | A1 | 7/2021 | Johnson et al. |
| 2021/0367476 | A1 | 11/2021 | Stafford et al. |
| 2022/0325722 | A1 | 10/2022 | Barnes et al. |

FOREIGN PATENT DOCUMENTS

| | | | |
|---|---|---|---|
| CN | 208489701 | U | 2/2019 |
| CN | 110126181 | A | 8/2019 |
| CN | 111564915 | A | 8/2020 |
| CN | 211630057 | U | 10/2020 |
| DE | 0870576 | C | 3/1953 |
| DE | 2939560 | A1 | 4/1981 |
| DE | 8900708 | U1 | 5/1990 |
| DE | 19818059 | A1 | 10/1999 |
| DE | 10325522 | A1 | 12/2004 |
| DE | 102010011630 | A1 | 9/2011 |
| DE | 102010036828 | A1 | 2/2012 |
| DE | 102013219119 | A1 | 3/2015 |
| DE | 102013114688 | A1 | 6/2015 |
| DE | 102015112539 | A1 | 2/2017 |
| DE | 102016206657 | A1 | 10/2017 |
| DE | 102017207526 | A1 | 11/2017 |
| DE | 102019131496 | A1 | 5/2020 |
| EP | 0425182 | A1 | 5/1991 |
| EP | 1528655 | A2 | 5/2005 |
| EP | 2064979 | B1 | 7/2009 |
| EP | 2410635 | A2 | 1/2012 |
| EP | 2557665 | A1 | 2/2013 |
| EP | 2902648 | A1 | 8/2015 |
| EP | 3073619 | A1 | 9/2016 |
| EP | 3306105 | A1 | 4/2018 |
| EP | 3411940 | A1 | 12/2018 |
| EP | 3487042 | A1 | 5/2019 |
| EP | 3496238 | A1 | 6/2019 |
| GB | 0173649 | A | 1/1922 |
| GB | 0823781 | A | 11/1959 |
| GB | 1509605 | A | 5/1978 |
| GB | 2325787 | A | 12/1998 |
| GB | 2406146 | A | 3/2005 |
| GB | 2493975 | A | 2/2013 |
| GB | 2495544 | A | 4/2013 |

(56) References Cited

FOREIGN PATENT DOCUMENTS

| | | | |
|---|---|---|---|
| GB | 2500580 | A | 10/2013 |
| GB | 2545269 | A | 6/2017 |
| GB | 2545413 | A | 6/2017 |
| GB | 2553242 | A | 2/2018 |
| GB | 2571553 | A | 9/2019 |
| GB | 2577546 | A | 4/2020 |
| GB | 2586844 | A | 3/2021 |
| JP | 47-038240 | U | 12/1972 |
| JP | 56-086047 | A | 7/1981 |
| JP | 58-029821 | U | 2/1983 |
| JP | 58-222745 | A | 12/1983 |
| JP | 60-154622 | U | 10/1985 |
| JP | 63-190310 | A | 8/1988 |
| JP | 05-084183 | A | 4/1993 |
| JP | 06-284619 | A | 10/1994 |
| JP | 07-245895 | A | 9/1995 |
| JP | 08-098441 | A | 4/1996 |
| JP | 08-203720 | A | 8/1996 |
| JP | 09-065604 | A | 3/1997 |
| JP | 09-135548 | A | 5/1997 |
| JP | 10-174331 | A | 6/1998 |
| JP | 10-271719 | A | 10/1998 |
| JP | 2818022 | B2 | 10/1998 |
| JP | 11-332204 | A | 11/1999 |
| JP | 2000-041365 | A | 2/2000 |
| JP | 2000-156952 | A | 6/2000 |
| JP | 2000-166193 | A | 6/2000 |
| JP | 2000-217753 | A | 8/2000 |
| JP | 2001-112206 | A | 4/2001 |
| JP | 2001-178066 | A | 6/2001 |
| JP | 2001-211599 | A | 8/2001 |
| JP | 2001-258186 | A | 9/2001 |
| JP | 2002-027694 | A | 1/2002 |
| JP | 2002-154133 | A | 5/2002 |
| JP | 2002-315257 | A | 10/2002 |
| JP | 2003-103558 | A | 4/2003 |
| JP | 2003-189533 | A | 7/2003 |
| JP | 2003-244908 | A | 8/2003 |
| JP | 2004-180396 | A | 6/2004 |
| JP | 2006-174581 | A | 6/2006 |
| JP | 2006-325309 | A | 11/2006 |
| JP | 2007506399 | A | 3/2007 |
| JP | 2008-079467 | A | 4/2008 |
| JP | 4797429 | B2 | 10/2011 |
| JP | 2012-019567 | A | 1/2012 |
| JP | 4985804 | B2 | 7/2012 |
| JP | 4993918 | B2 | 8/2012 |
| JP | 2012-193646 | A | 10/2012 |
| JP | 2013-160267 | A | 8/2013 |
| JP | 2015-007451 | A | 1/2015 |
| JP | 2015-033211 | A | 2/2015 |
| JP | 2016-008579 | A | 1/2016 |
| JP | 2016-056828 | A | 4/2016 |
| JP | 5918392 | B2 | 5/2016 |
| JP | 2016-205336 | A | 12/2016 |
| JP | 2017-158339 | A | 9/2017 |
| JP | 2018105269 | A | 7/2018 |
| JP | 6819760 | B2 | 1/2021 |
| KR | 10-1998-0020553 | A | 6/1998 |
| KR | 20100073449 | A | 7/2010 |
| KR | 20140135778 | A | 11/2014 |
| KR | 20170104402 | A | 9/2017 |
| KR | 20180083416 | A | 7/2018 |
| KR | 20200013047 | A | 2/2020 |
| KR | 20200069339 | A | 6/2020 |
| KR | 20200110809 | A | 9/2020 |
| WO | 92/08271 | A1 | 5/1992 |
| WO | 97/40569 | A1 | 10/1997 |
| WO | 2005/029680 | A1 | 3/2005 |
| WO | 2006/067736 | A1 | 6/2006 |
| WO | 2008/050637 | A1 | 5/2008 |
| WO | 2012/007858 | A1 | 1/2012 |
| WO | 2014/103758 | A1 | 7/2014 |
| WO | 2016/208629 | A1 | 12/2016 |
| WO | 2017/098202 | A1 | 6/2017 |
| WO | 2017/146031 | A1 | 8/2017 |
| WO | 2017/149820 | A1 | 9/2017 |
| WO | 2020/065254 | A1 | 4/2020 |

OTHER PUBLICATIONS

International Search Report and Written Opinion received for PCT Patent Application No. PCT/GB2022/051802, mailed on Oct. 20, 2022, 13 pages.

International Search Report and Written Opinion received for PCT Patent Application No. PCT/GB2022/051803, mailed on Oct. 17, 2022, 13 pages.

International Search Report and Written Opinion received for PCT Patent Application No. PCT/GB2022/051804, mailed on Oct. 14, 2022, 10 pages.

International Search Report and Written Opinion received for PCT Patent Application No. PCT/GB2022/051805, mailed on Oct. 25, 2023, 12 pages.

International Search Report and Written Opinion received for PCT Patent Application No. PCT/GB2022/051806, mailed on Oct. 25, 2022, 12 pages.

Search Report received for GB Application No. 2110082.1, mailed on Dec. 15, 2021, 2 pages.

Search Report received for GB Application No. 2110085.4, mailed on Dec. 15, 2021, 2 pages.

Search Report received for GB Application No. 2210023.4, mailed on Jan. 3, 2023, 2 pages.

Search Report received for GB Application No. 2110080.5, mailed on Dec. 17, 2021, 1 page.

Search Report received for GB Application No. 2110081.3, mailed on Dec. 21, 2021, 2 pages.

Search Report received for GB Application No. 2210024.2, mailed on Jan. 3, 2023, 1 page.

* cited by examiner

BRUSHLESS MOTOR

CROSS-REFERENCE TO PRIOR APPLICATION

This application is a § 371 National Stage Application of PCT International Application No. PCT/GB2022/051803 filed Jul. 12, 2022, which claims the priority of United Kingdom Application No. 2110085.4, filed Jul. 13, 2021, each of which are herein incorporated by reference in their entirety.

FIELD OF THE INVENTION

The present invention relates to a brushless motor.

BACKGROUND OF THE INVENTION

There is a general desire to improve electric machines, such as brushless motors, in a number of ways. For example, improvements may be desired in terms of size, weight, power density, manufacturing cost, efficiency, reliability, and noise.

SUMMARY OF THE INVENTION

According to a first aspect of the present invention there is provided a brushless motor comprising a stator assembly, a rotor assembly rotatable relative to the stator assembly, and a frame within which the stator assembly and the rotor assembly are housed, wherein the rotor assembly comprises a shaft, first and second bearings attached to the shaft, a permanent magnet attached to the shaft between the first and second bearings, an impeller attached to the shaft, the first bearing located further away from the impeller than the second bearing, and an o-ring mounted between the first bearing and the frame.

The brushless motor according to the first aspect of the present invention may be beneficial as the o-ring may at least partially vibrationally isolate the first bearing from the frame, and this may inhibit vibrations, and hence noise, from being transferred between the first bearing and the frame in use.

The o-ring may comprise a resiliently deformable member having a generally toroidal form, for example such that the o-ring extends annularly about the first bearing. The o-ring may be in contact with each of the first bearing and the frame.

The o-ring may be mounted between the first bearing and the frame such that the o-ring is able to move axially relative to the frame without deformation of the o-ring, for example able to roll axially in a direction parallel to a central longitudinal axis of the shaft. This may provide an arrangement with relatively low axial stiffness compared to, for example, an arrangement in which the o-ring is not able to move axially relative to the frame in a similar manner. Axial movement of the o-ring may also facilitate pre-loading of the first bearing, for example pre-loading of an outer race of the first bearing.

The o-ring may be mounted between the first bearing and the frame such that the o-ring is substantially uncompressed. This may provide relatively easy axial movement of the o-ring relative to the frame compared to, for example, an arrangement where the o-ring is mounted between the first bearing and the frame such that the o-ring is compressed.

The o-ring may comprise a substantially circular cross-sectional shape when mounted between the first bearing and the frame. This may provide easier axial movement of the o-ring compared to, for example, an o-ring comprising a polygonal cross-sectional shape.

The o-ring may comprise a radial stiffness in the region of $1.0\times10^6$ N/m to $4.0\times10^6$ N/m, for example around $2.5\times10^6$ N/m. Provision of an o-ring with a relatively high radial stiffness may provide a rotor assembly with a relatively high radial stiffness. This may enable the rotor assembly to comprise a sub-critical rotor assembly, which may allow the brushless motor to operate at a speed range below the resonant frequencies of the rotor assembly.

The o-ring may comprise a material having a Shore A hardness in the region of 65-90, for example a Shore A hardness in the region of 75. Such a Shore A hardness may provide an o-ring that is relatively resistant to compression in normal use, enabling the rotor assembly to comprise a sub-critical rotor assembly, whilst also enabling compression of the o-ring in the event of abnormal use, for example where the brushless motor is subject to forces due to being dropped in use. The o-ring may comprise an elastomeric material.

The o-ring may contact the frame over a region that is substantially smooth, and the o-ring may be able to move axially over the region of the frame. This may enable greater axial movement of the o-ring relative to the frame compared to, for example, an arrangement where the o-ring is disposed in a groove or channel formed in the frame. A region of the frame radially adjacent to the o-ring may be substantially smooth, for example substantially free of recesses and/or projections.

The o-ring may contact an outer surface of the first bearing over a region that is substantially smooth, and the o-ring may be able to move axially over the region of the outer surface. This may enable greater axial movement of the o-ring relative to the first bearing compared to, for example, an arrangement where the o-ring is disposed in a groove or channel formed on an outer surface of the first bearing. A region of an outer surface of the first bearing radially adjacent to the o-ring may be substantially smooth, for example substantially free of recesses and/or projections.

The frame may comprise a channel having a first portion with a first diameter, a second portion with a second diameter less than the first diameter, and a step defining a transition from the first portion to the second portion, the step defining an axial stop for inhibiting axial movement of the o-ring. This may inhibit axial motion of the o-ring in at least one axial direction in use. The first bearing may be partially located within the first portion and partially located within the second portion, for example with around half of a length of the first bearing located in the first portion and around half of the length of the first bearing located in the second portion. The o-ring may be located substantially centrally on the first bearing, for example at a location approximately halfway along the length of the first bearing.

The step may define an axial stop for inhibiting axial movement of the o-ring in a direction toward the impeller. This may inhibit axial motion of the o-ring toward the impeller in use.

The rotor assembly may comprise a pre-load spring for applying a load to an outer race of the first bearing. This may ensure correct alignment of the outer race and an inner race of the first bearing in use. The o-ring and the pre-load spring may enable relative axial movement of the outer face of the first bearing to the frame.

The o-ring may comprise a thermal conductivity of at least 3 W/mK. This may provide for heat transfer from the bearing to the frame in use.

The brushless motor may comprise a stopper for inhibiting radial motion of the rotor assembly relative to the frame. Use of an o-ring may enable radial movement of the first bearing in the event of forces experienced during abnormal use of the brushless motor, for example when the brushless motor or a device in which the brushless motor is installed is dropped, whilst provision of the stopper may prevent excessive radial motion of the rotor assembly relative to the frame. The stopper may inhibit the first bearing from contacting the frame. The stopper may inhibit the permanent magnet from contacting one or more pole faces of stator cores of the stator assembly in use, for example by virtue of the stopper inhibiting radial motion of the rotor assembly relative to the frame.

The stopper may comprise an end cap positioned to at least partially overlie the first bearing, and at least a portion of the end cap may be located between the first bearing and the frame. Providing the stopper as an end cap may provide for easier manufacture of the stopper compared to, for example, an arrangement where the stopper is integrally formed with the frame.

A first distance, for example a first radial distance, between the portion of the end cap located between the first bearing and the frame may be less than a second distance, for example a second radial distance, between the permanent magnet and the stator assembly. This may enable the stopper to inhibit the permanent magnet contacting the stator assembly, for example pole tips of stator cores of the stator assembly, in the event of radial movement of the rotor assembly in use.

The end cap may comprise a main body and a finger extending from the main body, the finger located between the first bearing and the frame. This may inhibit radial motion of the rotor assembly relative to the frame whilst also requiring less material for the end cap than, for example, a corresponding arrangement where the main body of the end cap is located between the bearing and the frame.

The finger may be resiliently deformable relative to the main body. This may enable the end cap to inhibit radial motion of the rotor assembly relative to the frame, whilst also accounting for tolerances that occur during manufacture. For example, a resiliently deformable finger may be deformable during positioning of the end cap relative to the frame such that tolerances introduced during manufacture of the frame may be accounted for.

The end cap may comprise a plurality of fingers extending from the main body, the plurality of fingers located between the first bearing and the frame. Using a plurality of fingers may enable radial motion of the rotor assembly relative to the frame to be inhibited at a number of locations, whilst still using less material than, for example, a monolithic member located between the first bearing and the frame about the entire periphery of the first bearing.

The plurality of fingers may be evenly spaced about a periphery of the end cap. This may allow for inhibition of radial motion of the rotor assembly relative to the frame about a periphery of the first bearing.

Each of the plurality of fingers may be resiliently deformable relative to the main body. This may facilitate positioning of the fingers between the frame and the first bearing, whilst also accounting for tolerances introduced during manufacture of the frame.

According to a second aspect of the present invention there is provided a vacuum cleaner comprising a brushless motor according to the first aspect of the present invention.

DETAILED DESCRIPTION OF THE INVENTION

Figure 1:
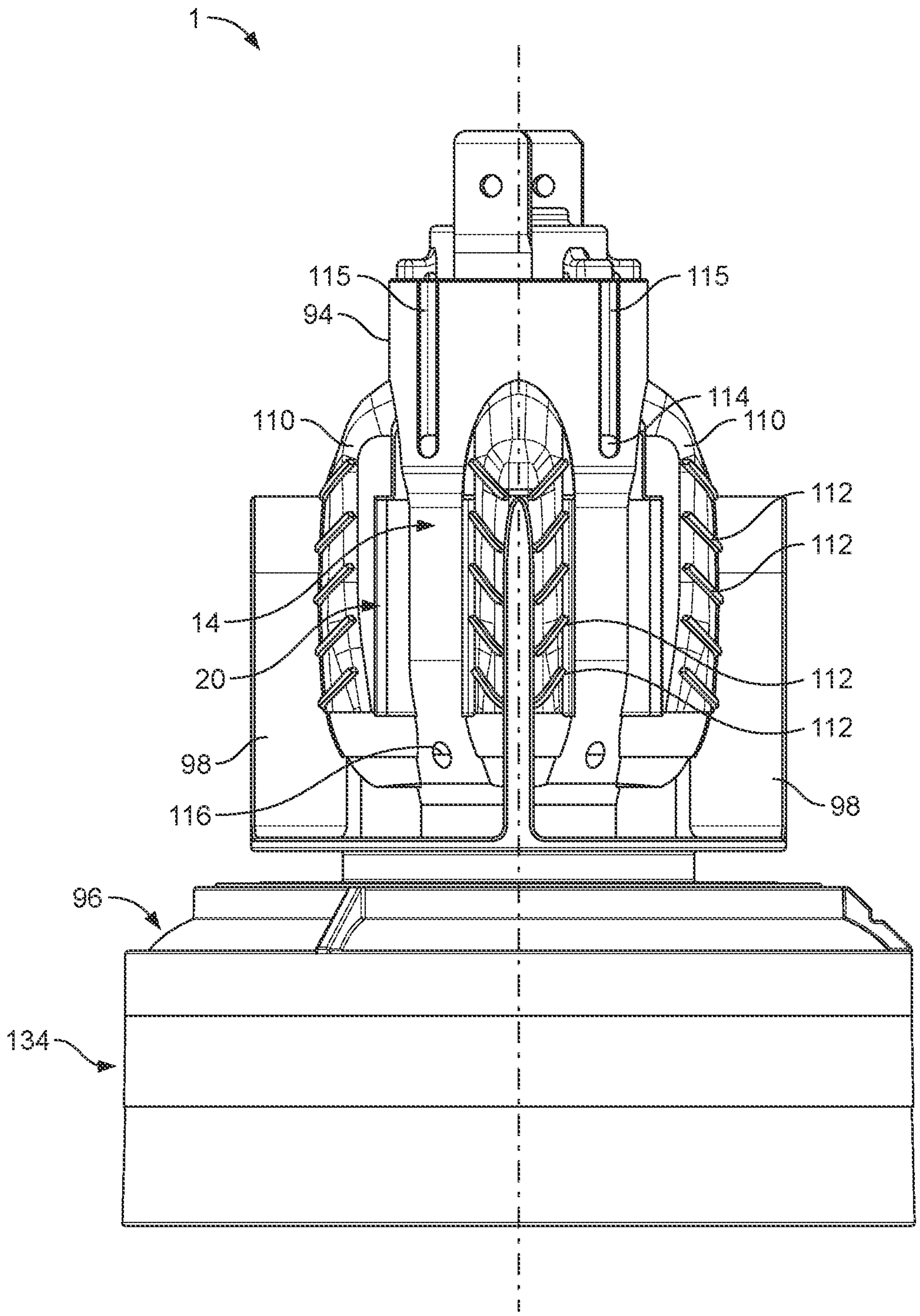
FIG. 1 is a perspective view of a brushless permanent magnet motor.

A brushless permanent magnet motor according to the present invention, generally designated 1, is illustrated in FIG. 1, with components of the brushless permanent magnet motor illustrated in FIGS. 2 to 7. Although described here in relation to a brushless permanent magnet motor, it will be appreciated by a person skilled in the art that at least some of the teachings disclosed herein may be applicable to other types of brushless motor.

The brushless permanent magnet motor comprises a stator assembly 10, a rotor assembly 12, and a frame 14.

Figure 2:
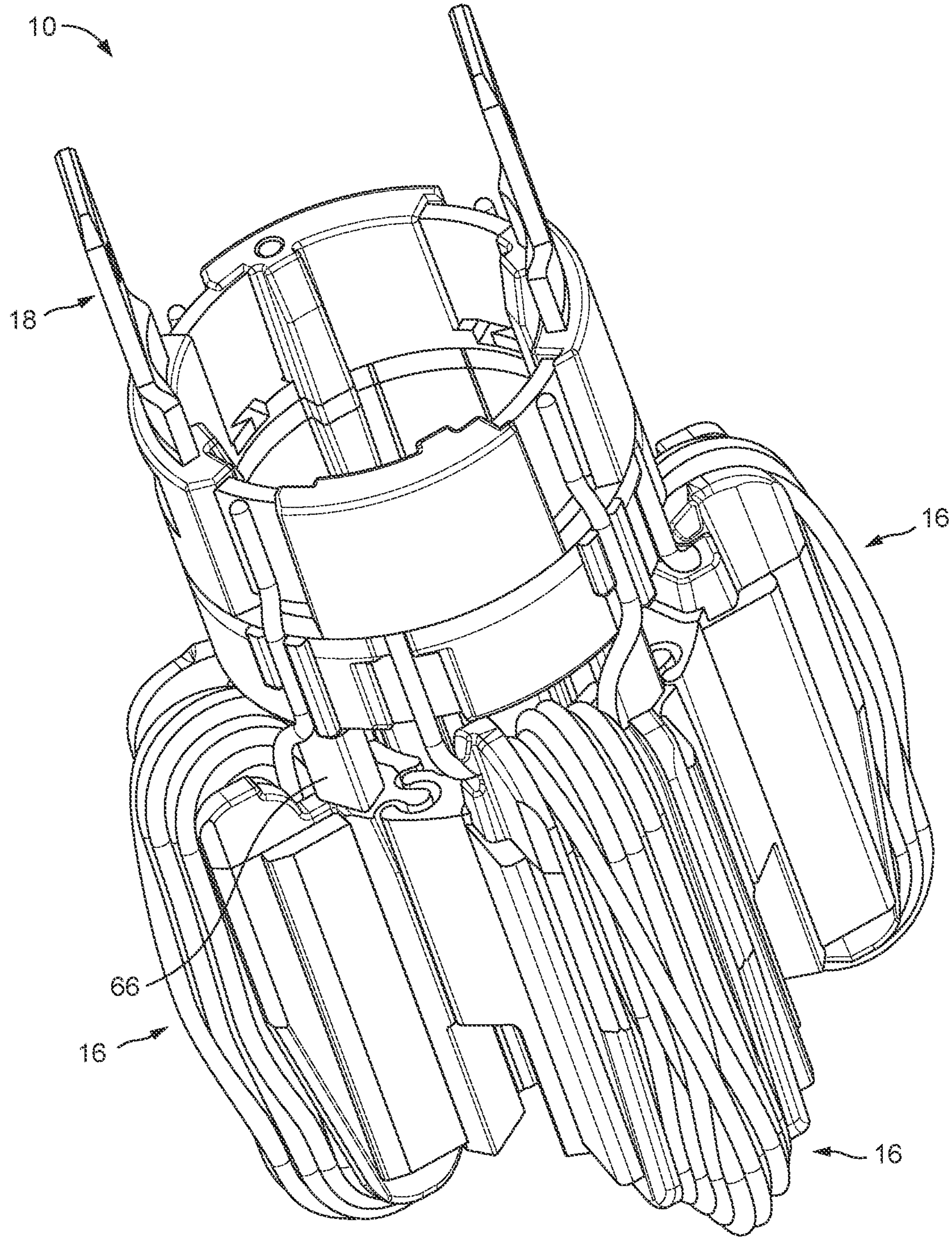
FIG. 2 is a perspective view of a stator assembly of the brushless permanent magnet motor of FIG. 1.
Figure 3:
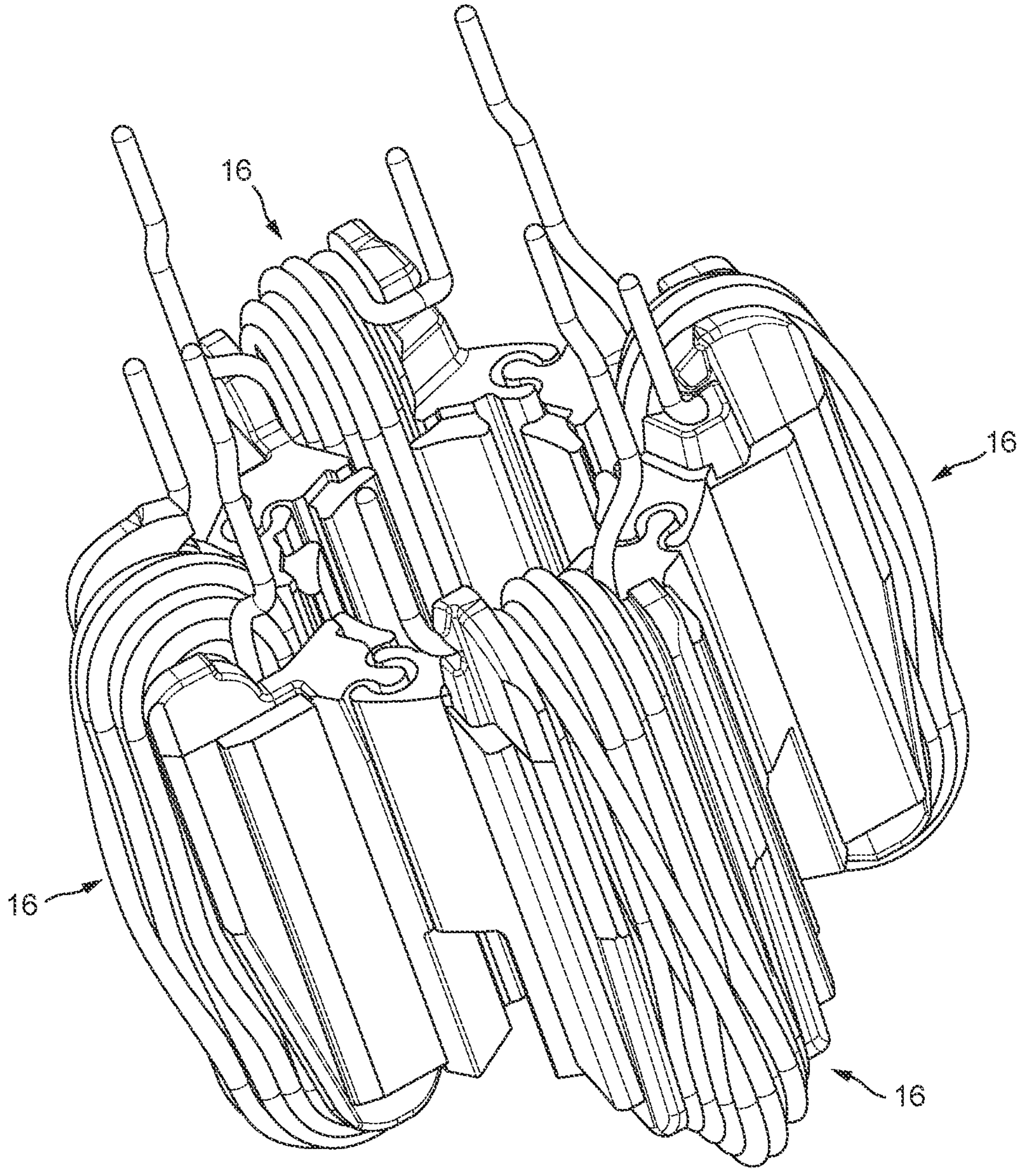
FIG. 3 is a perspective view of a plurality of stator core sub-assemblies of the stator assembly of FIG. 2.
Figure 4:
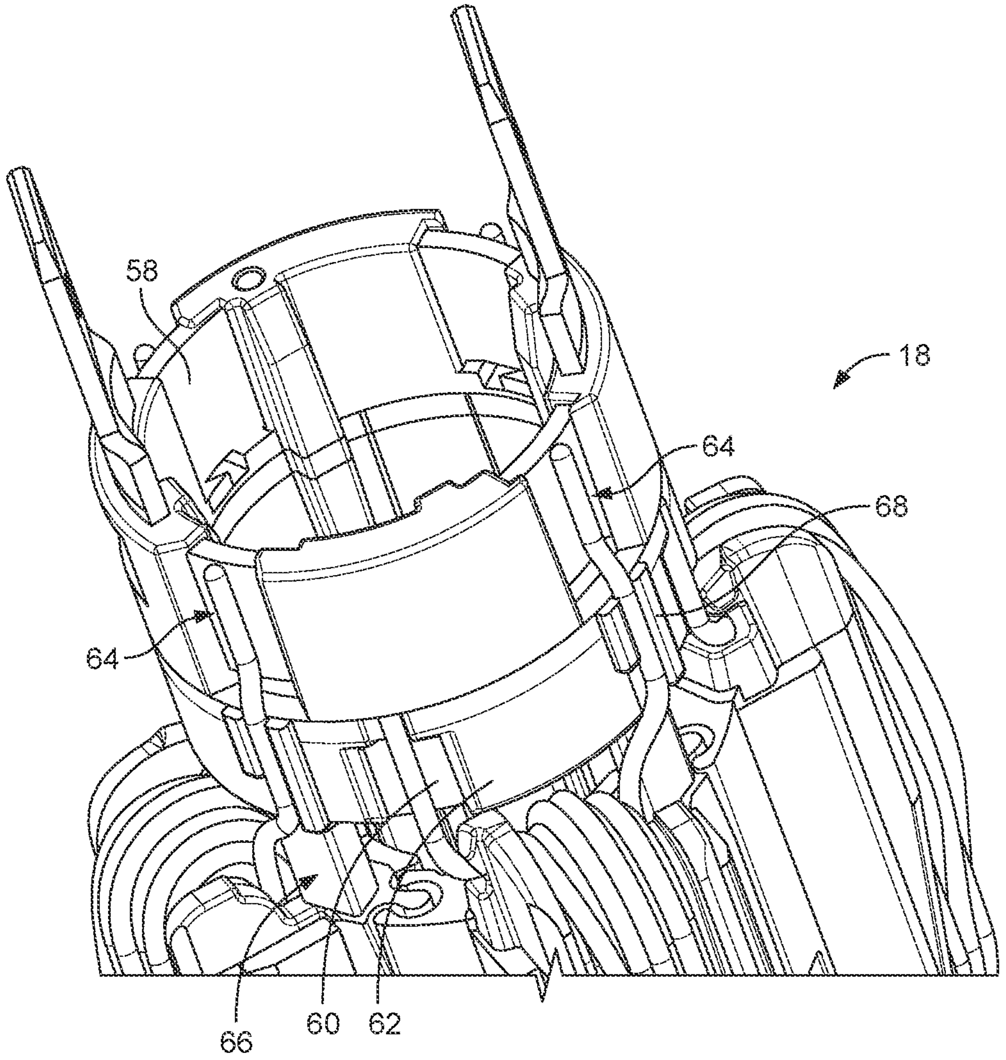
FIG. 4 is a perspective view of a termination assembly of the stator assembly of FIG. 2.
Figure 5:
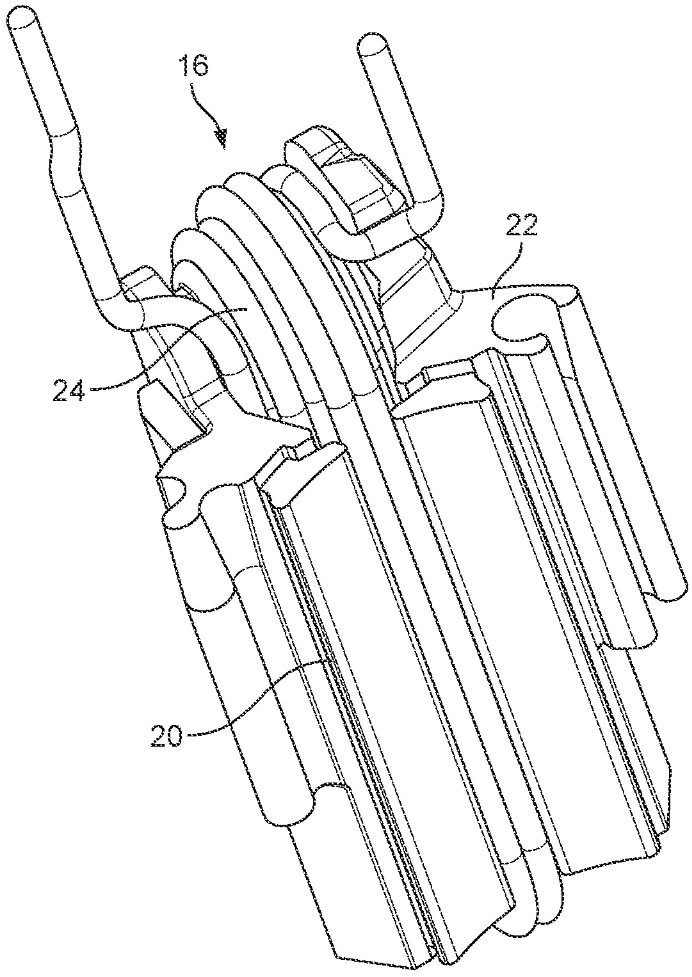
FIG. 5 is a perspective view of a single stator core sub-assembly of the stator assembly of FIG. 2.

The stator assembly 10 is illustrated in isolation in FIG. 2, and comprises four stator core sub-assemblies 16 and a termination assembly 18. The four stator core sub-assemblies are shown connected in FIG. 3, with the termination assembly 18 shown in isolation in FIG. 4. An individual stator core sub-assembly 16 can be seen in FIGS. 5 and 6, and it will be appreciated that each stator core sub-assembly 16 has substantially the same structure.

The stator core sub-assembly 16 comprises a stator core 20, a bobbin 22, and a winding 24 wound about the bobbin 22. The stator core 20 has a back 26, and first 28 and second 30 arms extending from the back 26. The stator core 20 has a generally C-shaped form, and may be referred to as a c-core. The first 28 and second 30 arms each comprise a respective first portion 32,34 and a respective second portion 36,38. Each first portion 32,34 extends substantially orthogonally from the back 26, and each second portion 36,38 is angled at around 28 degrees relative to the respective first portion 32,34. Each second portion 36,38 is around 2 times the length of the respective first portion 32,34.

Figure 6:
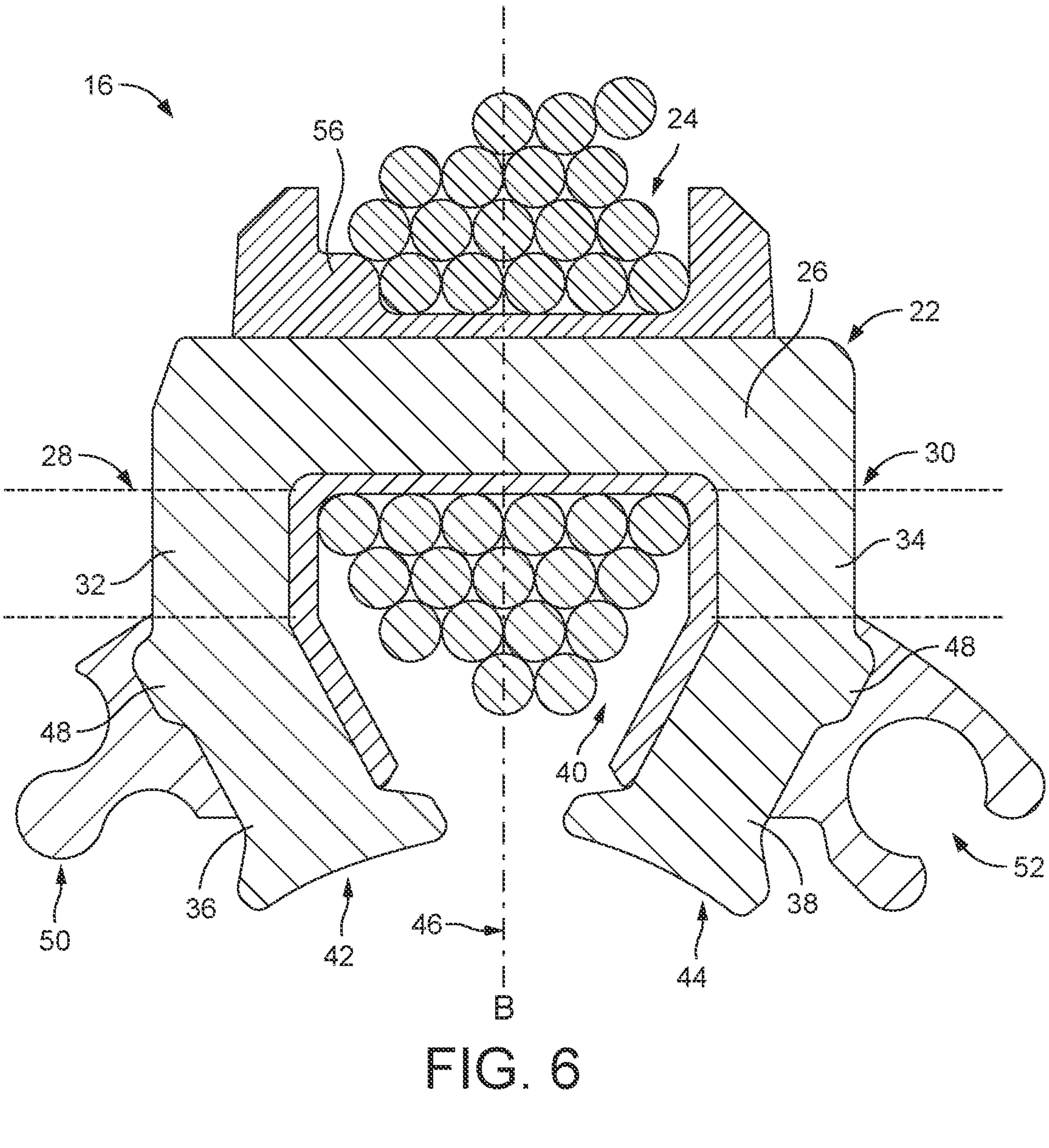
FIG. 6 is a cross-sectional view through the stator core sub-assembly of FIG. 5.

The second portions 36,38 are angled inwardly toward one another, and collectively the back 26 and the first 28 and second 30 arms define a winding channel 40 within which the winding 24 is located. Given the relative orientations of the back 26 and the first 28 and second 30 arms, the winding channel 40 has a generally trapezoidal cross-sectional area, as seen in FIG. 6. It has been found that provision of a generally trapezoidal winding channel 40 may enable a winding pattern of the winding 24 that achieves a relatively high fill factor, whilst angling the second portions 36,38 of the first 28 and second 30 arms inwardly toward one another may reduce a height of the stator core 20.

The stator core 20 comprises pole faces 42,44 disposed at ends of the respective second portions 36,38, with the pole faces 42,44 extending to either side of the respective second portions 36,38. The pole faces 42,44 are spaced apart from one another to define a slot gap 46, with the slot gap 46 defining a point of entry into the winding channel 40. The pole faces 42,44 are asymmetric to provide saliency, and are curved with each pole face 42,44 having a different center of curvature. The asymmetry of the pole faces 42,44 results in different distances from each pole face 42,44 to a centre line B of the slot gap 46. Each pole face 42,44 is asymmetric relative to the other pole face 44,42, but each individual pole face 42,44 is also asymmetric about a center line of that pole face.

To maximise flux linkage between the stator core 20 and the rotor assembly 12 in use, it may be desirable for the pole faces 42,44 to be as wide as possible. However, increasing the width of the pole faces 42,44 in an inward direction may reduce a width of the slot gap 46, making winding of the stator core 20 difficult. Increasing the width of the pole faces 42,44 in an outward direction may increase flux leakage between adjacent stator cores 20 in the stator assembly 10. To provide a compromise between these competing factors, a ratio of the combined width of the pole faces 42,44 to the width of the slot gap 46 is in the region of 3:1 to 7:1.

The stator core 20 is formed of a plurality of laminations, each having the form previously described. A protrusion 48 is located on an outer surface of each second portion 36,38, with the protrusions 48 being used to weld the laminations together to form the stator core 20. In other examples, the laminations are glued together rather than welded. The protrusions 48 may be located out of a main flux loop of the stator assembly 10 in use, which may minimise stator iron loss. The protrusions 48 are located at a same distance along each respective second portion 36,38, which may minimise induced voltage potential between the two points so as to minimise losses. The back 26 is asymmetric about the centre line B of the slot gap, which enables correct orientation of the stator core 20 during manufacture.

The bobbin 22 is overmoulded to the stator core 20, such that the bobbin 22 overlies inner and outer surfaces of the back 26, inner surfaces of the first portions 32,34 of the first 28 and second 30 arms, and inner and outer surfaces of the second portions 36,28 of the first 28 and second 30 arms. The bobbin 22 thereby lines the winding channel 40, and allows the winding 24 to be wound about the back 26 of the stator core 20. Overmoulding the bobbin 22 to the stator core 20 enables the bobbin to have a wall thickness in the region of 0.4 mm in the winding channel 40, which may maximise the available cross-sectional area to be filled with the winding 24.

The bobbin 22 is overmoulded to the stator core 20 such that shoulders of the stator core 20, i.e. portions of the stator core the bridge the back 26 and the first portions 32,34 of the first 28 and second 30 arms, are exposed, and such that the pole faces 42,44 are exposed, for reasons that will be discussed hereafter.

A region of the bobbin 22 on an outer surface of the second portion 36 of the first arm 28 defines a first connection portion 50, and a region of the bobbin 22 on an outer surface of the second portion 38 of the second arm 30 defines a second connection portion 52. The first connection portion 50 comprises a rounded projection that extends partially along the length of the bobbin 22, and the second connection portion 52 comprises a rounded recess that extends partially along the length of the bobbin 22. The first 50 and second 52 connection portions are complementarily shaped, such that adjacent bobbins 22 in the stator assembly 10 can be connected to one another by axially sliding the relevant connection portions 50,52 together. The connection portions 50,52 allows relative axial movement of connected bobbins 22, whilst inhibiting circumferential and radial separation of the bobbins 22. The connection portions 50,52 enable individual stator core sub-assemblies 16 to be connected together during manufacture, as will be described hereinafter.

As seen in the cross-sectional view of FIG. 6, the bobbin 22 comprises a winding guide 56 located in a region of an outer surface of the back 26. The winding guide 56 serves to guide the winding 24 during winding of the stator core 22.

When wound, as seen in the cross-sectional view of FIG. 6, the winding 24 has a generally trapezoidal form within the winding channel 40. This may provide a relatively high fill factor. The winding 24 is asymmetric about the back 26, with the portion of the winding 24 that overlies an outer surface of the back 26 defining a different cross-sectional shape to the portion of the winding 24 located within the winding channel 40. This may enable a relatively high fill factor within the winding channel 24, whilst still providing flexibility for connection to terminals of the termination assembly 18.

The termination assembly 18 comprises a first, upper, terminal 58, a second, lower, terminal 60, and a sleeve 62. Each of the first 58 and second 60 terminals is generally annular in form, with the first terminal 58 overlying the second terminal 60. The sleeve 62 is overmoulded to the first 58 and second 60 terminals such that the relative positions of the first 58 and second 60 terminals are maintained. The sleeve 62 comprises a plurality of apertures 64 which enable the windings 24 of the stator core sub-assemblies 16 to be connected to the first 58 and second 60 terminals. The sleeve 62 further comprises a plurality of locating features 66 for locating the sleeve 62 relative to the bobbins 22 during manufacture, and wire guides 68 formed on the locating features 66. The locating features 66 are each located adjacent to a corresponding aperture 64.

Figure 7:
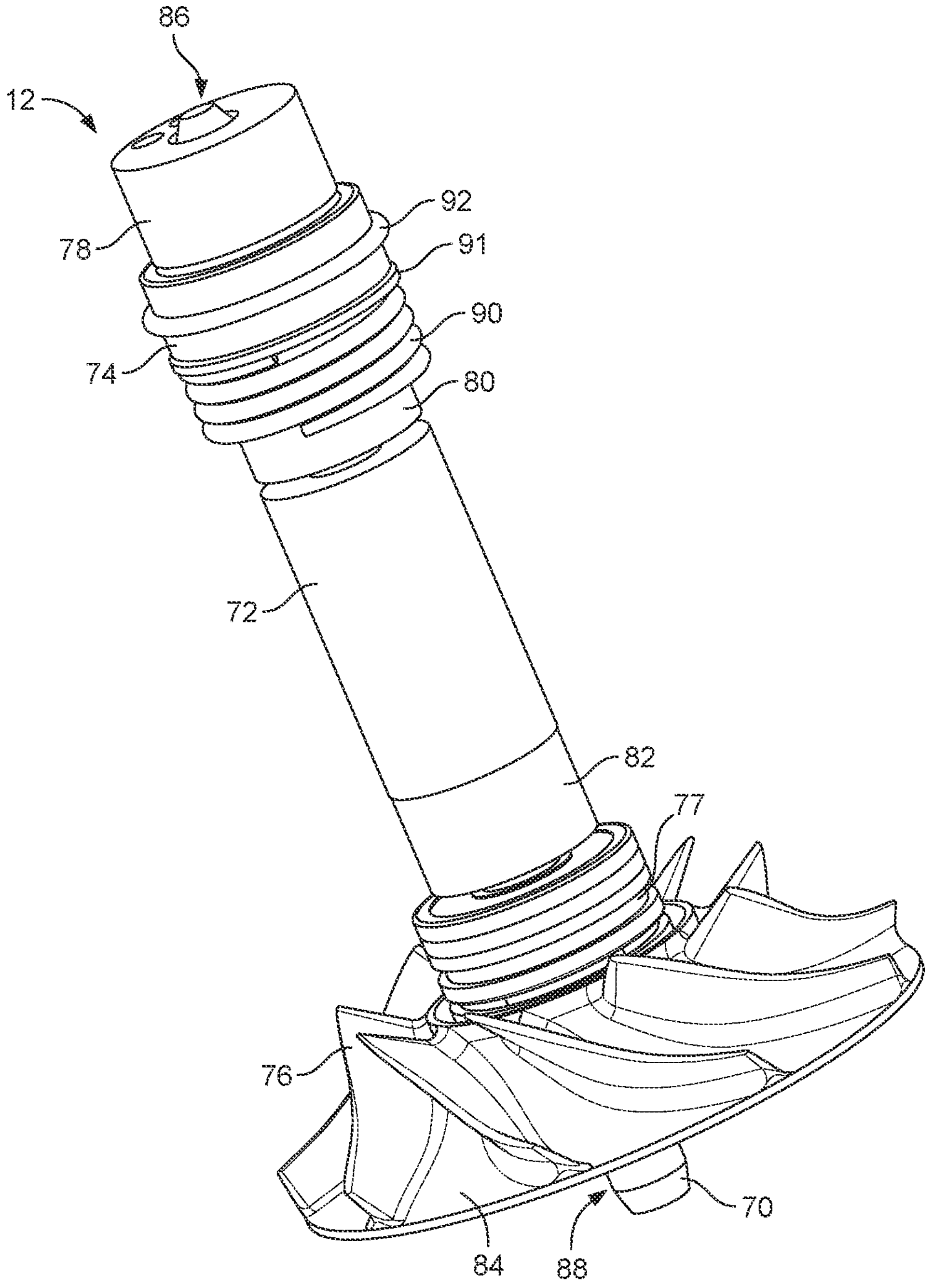
FIG. 7 is a perspective view of a rotor assembly of the brushless permanent magnet motor of FIG. 1.

The rotor assembly 12 is shown in isolation in FIG. 7. The rotor assembly 12 comprises a shaft 70, a permanent magnet 72, first 74 and second 76 bearings, first 78, second 80 and third 82 balancing rings, and an impeller 84.

The shaft 70 is elongate in form, having an inlet end 86 and an outlet end 88, with inlet and outlet referring generally to a direction of airflow through the brushless permanent magnet motor 1 in use. The permanent magnet 72 is mounted generally centrally along the shaft 70. The first balancing ring 78 is mounted to the shaft 70 at the inlet end 86, with the first bearing 74 mounted to the shaft 70 adjacent to the first balancing ring 78. The second balancing ring 80 is mounted to the shaft 70 between the first bearing 74 and the permanent magnet 72.

The impeller 84 is mounted to the outlet end 88 of the shaft 70. The second bearing 76 is mounted to the shaft 70 adjacent to the impeller 84, with the third balancing ring 82 mounted to the shaft 70 between the second bearing 76 and the permanent magnet 72. The second bearing 76 comprises annular grooves 77 for receiving adhesive.

The rotor assembly 12 further comprises a pre-load spring 90 for applying a pre-load to the first bearing 74, an annular washer 91 in contact with the pre-load spring 90 and the outer race of the first bearing 74, and an o-ring 92 located about the first bearing 74, as will be discussed in more detail hereinafter.

Figure 8:
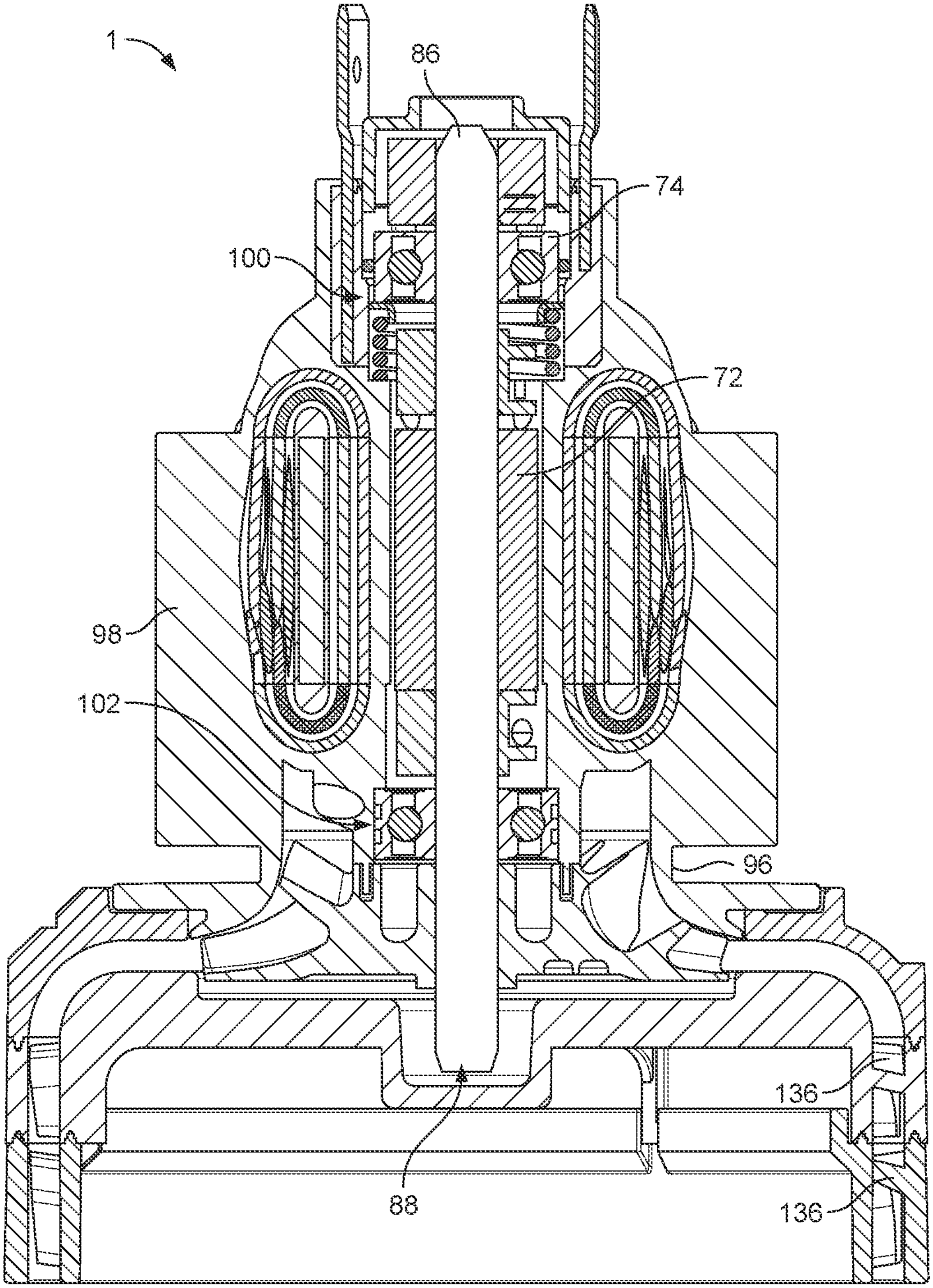
FIG. 8 is a cross-sectional view through the brushless permanent magnet motor of FIG. 1.
Figure 9:
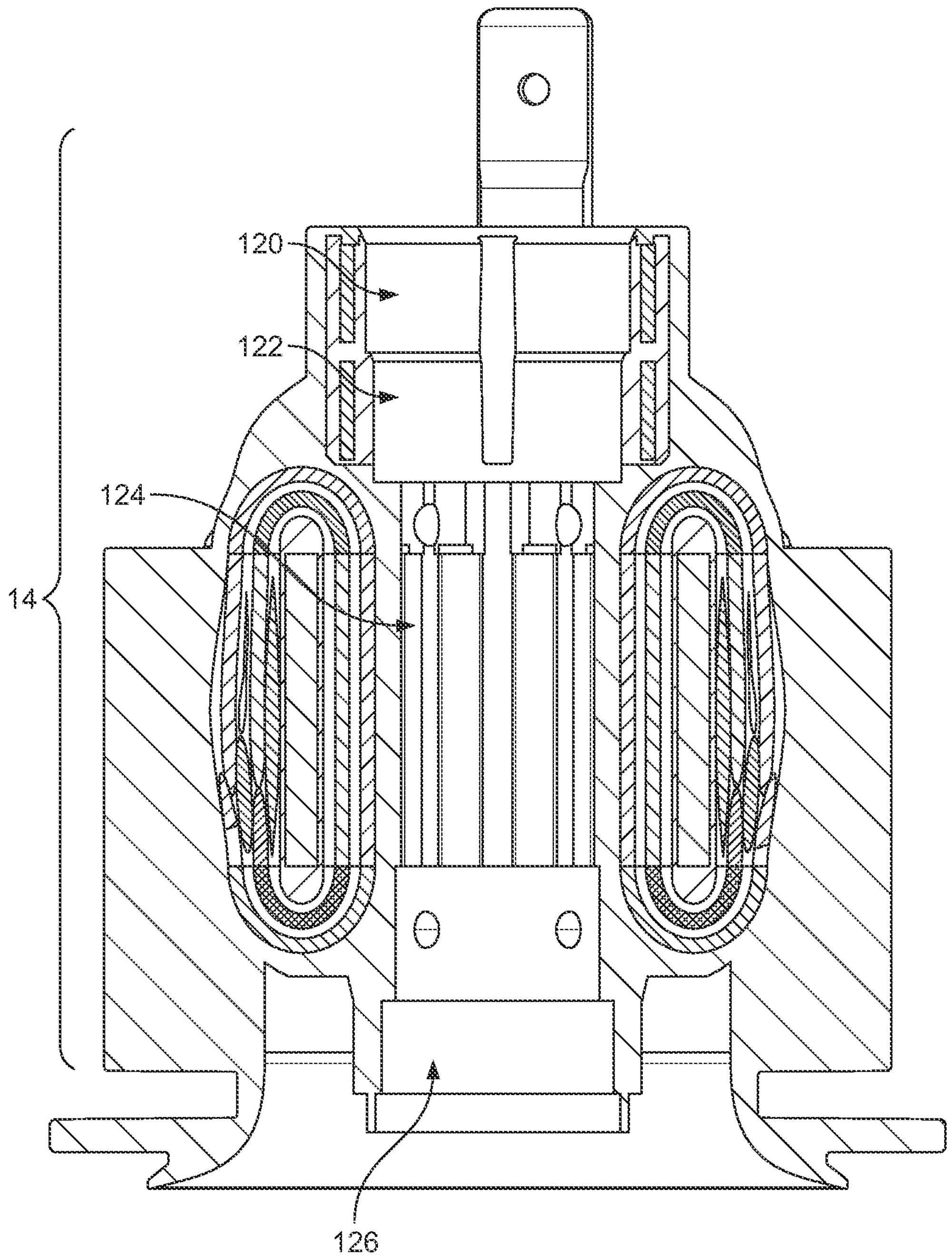
FIG. 9 is a cross-sectional view through the brushless permanent magnet motor of FIG. 1 with the rotor assembly and diffuser removed.

The frame 14 can be seen in FIGS. 1, 8 and 9, and comprises a main body 94, a shroud 96, and a plurality of struts 98 extending between the main body 94 and the shroud 96. The main body 94 is generally cylindrical in form, defines first 100 and second 102 bearing seats for the respective first 74 and second 76 bearings, and defines a channel 104 within which the rotor assembly 12 is received. The shroud 96 is radially spaced from the main body 94, and has a central aperture that overlies the impeller 84, such that airflow can interact with the impeller 84 in use.

To manufacture the frame 14, the frame 14 is overmoulded to the stator assembly 10 in an overmoulding process. Given the form of the wound stator core sub-assemblies 16, the overmoulding of the frame 14 results in the main body 94 of the frame 14 having protrusions 110 which overlie the windings 24 located on the backs 26 of the stator cores 22. The protrusions 110 are formed such that the shoulders of the stator cores 22 are not covered by the frame 14. This allows the shoulders of the stator cores 22 to be exposed to airflow through the brushless permanent magnet motor 1 in use, which may provide a cooling effect for the stator cores 22. The frame 14 is also overmoulded such that the pole faces 42,44 of the stator cores 22 are exposed to the interior of the channel. Collectively, at least 10% but no more than 30% of each stator core is not covered by the frame 14.

The protrusions 110 define regions of increased radius relative to the regions of the main body 94 that lie between adjacent stator core sub-assemblies. This reduces a volume of material required for the frame 14 compared to a frame that has a constant radius, and may provide improved heat transfer may removing unnecessary frame material.

To aid with heat transfer away from the rotor assembly 12 and the stator assembly 10 in use, the frame 14 is formed from a material having a through-plane thermal conductivity, of at least 1.5 W/mK. To provide strength to the brushless permanent magnet motor 1, the frame comprises a Young's modulus in the region of 10-45 GPa, for example in the region of 25 GPa.

To further aid with heat transfer away from the windings 24, the frame 14 comprises a plurality of turbulators 112 formed on the protrusions 110. Each turbulator 112 is a projection upstanding from a protrusion 110, with the turbulators 112 formed as part of the same overmoulding process that defines the rest of the frame 14. It will be appreciated that in alternative embodiments the turbulators 112 may be formed as separate components to the remainder of the frame 14, and attached to the frame 14 in any appropriate manner, such as via an adhesive or the like.

The turbulators 112 are arranged in pairs along the length of each protrusion 110. Each turbulator 112 is angled at around 60 degrees relative to an axis parallel to a central longitudinal axis of the brushless permanent magnet motor 1, i.e. an axis parallel to the shaft 70. Collectively a pair of turbulators 112 defines a general chevron-like shape, with the chevron-like shape pointing toward the impeller 84. In alternative embodiments, not illustrated here, each turbulator 112 may itself comprise a chevron-shape.

There may be a compromise to be reached in terms of allowing the turbulators 112 to generate vortices in the region of the protrusions 110 to aid with transfer of heat away from the windings 24 of the stator assembly 10 in use, versus avoiding choking airflow through the brushless permanent magnet motor 1 in use. A pitch to height ratio of each turbulator in the region of 10:1 has been found to be an effective compromise, with a height of each turbulator in the region of 0.6 mm, for example around 0.58 mm.

The form of turbulator 112 described above may be effective at generating vortices in the region of the protrusions 110, which overlie the windings 24 on the backs 26 of the stator cores 22, with such vortices aiding with transfer of heat away from the windings 24 of the stator assembly 10 in use.

The struts 98 extend from the protrusions to the shroud 96, such that the struts 98 also overlie the windings 24 on the backs 26 of the stator cores 22. The struts 98 may thereby act as heat sinks for the windings 24, with airflow moving over the struts 98 in use to carry heat away from the struts 98. A leading end of each strut 98 is substantially aligned with a leading edge of a winding 24 that the strut overlies to ensure that the strut 98 is aligned with the appropriate heat source, i.e. winding 24. The leading end of each strut is aerodynamically shaped, in a curved manner, to promote desirable airflow characteristics through the brushless permanent magnet motor 1 in use.

The main body 94 of the frame 14 comprises a plurality of inlet cooling apertures 114, a plurality of outlet cooling apertures 116, and an adhesive injection aperture (not shown). The plurality of inlet cooling apertures 114 are located in a region below the first bearing seat 100, and are spaced about the periphery of the main body 94. The plurality of inlet cooling apertures 114 are shaped to direct airflow flowing through the brushless permanent magnet motor 1 in use into the channel 104, which provides a cooling effect for the rotor assembly 12. The main body 94 of the frame 14 further comprises a plurality of inlet guide grooves or channels 115 formed in the outer surfaces of the main body 94, with each of these inlet guide grooves 115 being arranged to guide airflow flowing through the brushless permanent magnet motor 1 in use into a respective inlet cooling aperture 114. Each of the plurality of inlet guide grooves 115 extend axially, in a direction parallel to a central longitudinal axis of the brushless permanent magnet motor 1, from the upstream end of the main body 94 of the frame 14 to the respective inlet cooling apertures 114.

The plurality of outlet cooling apertures 116 are located in a region of the second bearing seat 102, and are spaced about the periphery of the main body 94. The plurality of outlet cooling apertures 116 are shaped to direct airflow flowing through the channel 104, outwardly from the frame 14, before the airflow passes through the impeller 84. The adhesive injection aperture allows insertion of adhesive into the annular grooves 77 of the second bearing 76 through the frame 14.

An outlet end of the main body 94 of the frame defines a labyrinth seal with the impeller 84.

A cross-section through the brushless permanent magnet motor 1 is shown in FIGS. 8 and 9. As can be seen, the rotor assembly 12 sits within the frame 14, with the first bearing 74 located at the first bearing seat 100, the second bearing 76 located at the second bearing seat 102, and the permanent magnet 72 aligned with the stator cores 22 of the stator assembly 10. The second bearing 76 is secured to the second bearing seat 102 by adhesive located in the annular grooves 77 formed on the outer race of the second bearing 76.

The channel 104 of the frame comprises first 120 and second 122 portions of different diameters in the region of the first bearing 74, with the first 120 and second 122 portions collectively defining the first bearing seat 100.

The o-ring 92 is located substantially centrally along the axial length of the first bearing 74. The o-ring 92 sits between the first bearing 74 and the frame 14 in the first portion 120 of the channel 104 such that the o-ring 92 is substantially uncompressed, and has a substantially circular cross-sectional profile. The o-ring has a shore A hardness of around 75, and has a radial stiffness in the region of $1.0\times10^6$ N/m to $4.0\times10^6$ N/m, for example around $2.5\times10^6$ N/m. Providing the o-ring 92 with a relatively high radial stiffness may in turn provide the rotor assembly 12 with a relatively high radial stiffness. This allows the rotor assembly 12 to operate as a sub-critical rotor assembly, and allows the brushless permanent magnet motor 1 to operate in a speed range below all resonant frequencies of the rotor assembly 12. The o-ring 92 has a thermal conductivity of at least 3 W/mK, which may aid with heat transfer away from the first bearing 74 in use.

The low compression of the o-ring 92 between the first bearing 74 and the frame 14 in the first portion 120 of the channel 104, along with the substantially circular cross-sectional profile of the o-ring 92, enables the o-ring 92 to roll axially, in a direction parallel to a central longitudinal axis of the brushless permanent magnet motor 1. This may facilitate pre-loading of the first bearing 74 by the pre-load spring 90 via the annular washer 91. A step change between the first 120 and second 122 portions of the channel 104 defines an axial stop for inhibiting motion of the o-ring 92 toward the impeller 84.

A third portion 124 of the channel 104 has a reduced diameter relative to the first 120 and second 122 portions of the channel 104, with the permanent magnet 72 sitting within the third portion 124 of the channel 104. A step change between the second 122 and third 124 portions of the channel 104 defines a seat for the pre-load spring 90. A fourth portion 126 of the channel 104 has an increased diameter relative to the third portion of the channel 104, with the fourth portion 126 of the channel 104 defining the second bearing seat 102.

Whilst the o-ring 92 is relatively stiff, the o-ring 92 is still deformable in the event that the brushless permanent magnet motor 1 experiences forces during abnormal use, for example as a result of the brushless permanent magnet motor 1 or a product in which the motor is installed being dropped. A distance between the first bearing 74 and a wall of the channel 104 in the first portion 120 is greater than a distance between the first bearing 74 and a wall of the channel 104 in the second portion 122. Similarly, the distance between the first bearing 74 and a wall of the channel 104 in the second portion 122 is greater than a distance between the permanent magnet 72 and a wall of the channel 104 in the third portion 124, and greater than a distance between the permanent magnet 72 and the pole faces 42,44 in the third portion 124. As a result, when the o-ring 92 is compressed during abnormal use, there is a risk that the permanent magnet 72 will contact the pole faces 42,44 or the wall of the channel 104 in the third portion 124, which can cause damage to the permanent magnet 72.

Figure 10:
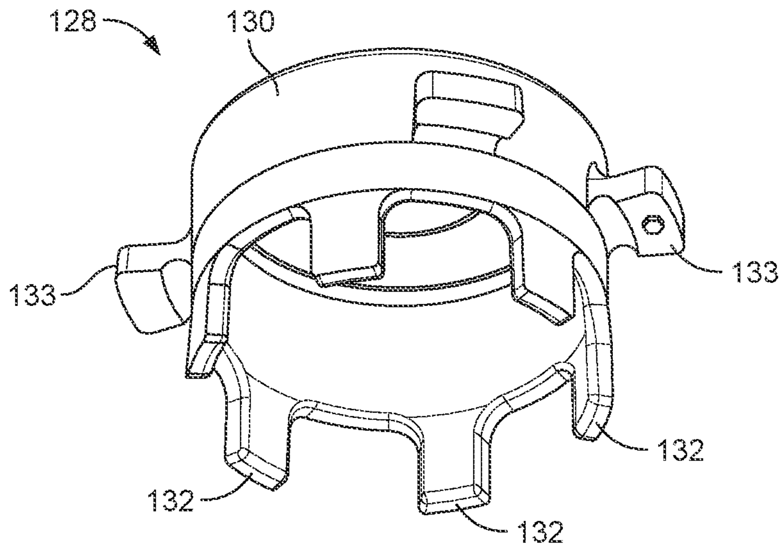
FIG. 10 is a perspective view of an end cap of the brushless permanent magnet motor of FIG. 1.

To avoid this happening, the brushless permanent magnet motor 1 has an end cap 128, which is shown in isolation in FIG. 10.

The end cap 128 comprises a main body 130, a plurality of fingers 132 extending from the main body 130, and a plurality of flanges 133 extending from the main body 128. The main body 130 is generally cylindrical in form, and hollow. The main body 130 overlies the inlet end 86 of the shaft 70 and the first balancing ring 78 when the brushless permanent magnet motor 1 is assembled. The plurality of fingers 132 are resiliently deformable, and, when not mounted to the brushless permanent magnet motor 1, the plurality of fingers 132 splay slightly outwardly from the main body 128. The plurality of fingers 132 extend from the main body 128 in a first direction, and the plurality of flanges 133 extend from the main body 128 in a second direction substantially orthogonal to the first direction. The plurality of flanges 133 engage the main body 94 of the frame 14 to prevent over-insertion of the end cap 128 into the frame 14.

Figure 11:
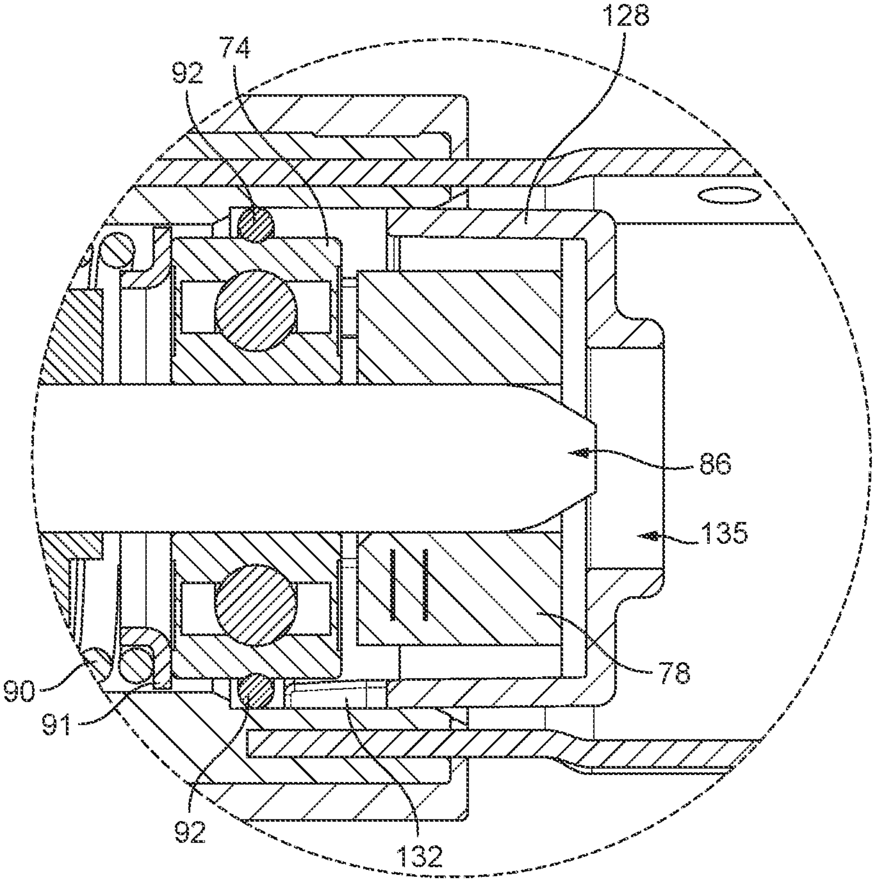
FIG. 11 is an enlarged cross-sectional view of an inlet end of the brushless permanent magnet motor of FIG. 1.

An enlarged view of the end cap 128 located at the inlet end 86 of the shaft 70 is shown in FIG. 11.

The end cap 128 is located in the first portion 120 of the channel 104 such that the fingers 132 contact the wall of the first portion 120 of the channel 104 to retain the end cap 128 within the first portion 120. The plurality of fingers 132 are located between the first bearing 74 and the wall of the first portion 120 of the channel 104, with the plurality of fingers 132 spaced from the first bearing 74. A distance between the first bearing 74 and the plurality of fingers 132 is less than the distance between the permanent magnet 72 and a wall of the channel 104 in the third portion 124, and less than the distance between the permanent magnet 72 and the pole faces 42,44 in the third portion 124.

Thus in the event that the o-ring 92 is deformed when the brushless permanent magnet motor 1 experiences forces during abnormal use, the first bearing 74 contacts at least some of the plurality of fingers 132 before the permanent magnet 72 is able to contact the pole faces 42,44 or the wall of the channel 104 in the third portion 124. Thus the plurality of fingers 132 may act as a stopper to inhibit radial motion of the first bearing 74.

As depicted here, the end cap 128 comprises an aperture 135 through which the shaft 70 extends. In alternative embodiments, the end cap 128 may not comprise the aperture 135, which may facilitate creation of a sealed bearing cartridge. Similarly, the plurality of inlet cooling apertures 114 and the plurality of outlet cooling apertures 116 may be omitted where a sealed bearing cartridge is desirable. A sealed bearing cartridge may inhibit airflow from entering the region of the frame 14 in which the bearings 74,76 are housed in use, which may reduce emissions.

The brushless permanent magnet motor 1 further comprises a diffuser 134 located downstream of the impeller 84. The diffuser 134 is attached to the shroud 96 and comprises a plurality of vanes 136 for turning airflow as it passes through the diffuser 134 from the impeller 84 in use. Although depicted as a multi-stage diffuser, ie a diffuser with more than one row of vanes, it will be appreciated that other forms of diffuser, such as a single stage diffuser, are also envisaged.

In use, current is passed through the windings 24 of the stator assembly 10 to generate a magnetic field that interacts with the permanent magnet 72 to cause rotation of the rotor assembly 12, and hence rotation of the impeller 84. This causes air to be drawn into the brushless permanent magnet motor 1, where air interacts with the impeller 84 before exiting the brushless permanent magnet motor 1 via the diffuser 134.

Steps involved in manufacture of the brushless permanent magnet motor 1 will now be reiterated.

Each stator core sub-assembly 16 is assembled individually, with the bobbin 22 overmoulded to the stator core 20, and the winding 24 wound about the bobbin 22. Individual stator core sub-assemblies 16 are connected to one another via the first 50 and second 52 connection portions of the respective bobbins 22.

The sleeve 62 is overmoulded to the first 58 and second 60 terminals to define the termination assembly 18, and the windings 24 are fused to the first 58 and second 60 terminals. Collectively, the stator core sub-assemblies 16 and the termination assembly 18 define the stator assembly 10. The sleeve 62 and the bobbins 22 are formed from different materials, and are overmoulded to their respective components in separate overmoulding processes.

The frame 14 is overmoulded to the stator assembly 10 in a separate overmoulding process to each of those of the bobbins 22 and the sleeve 62, and the frame 14 is formed from the same material as the sleeve 62.

The rotor assembly 12 is inserted into the frame 14, and the end cap 128 is located over the inlet end 86 of the shaft 70.

Figure 12:
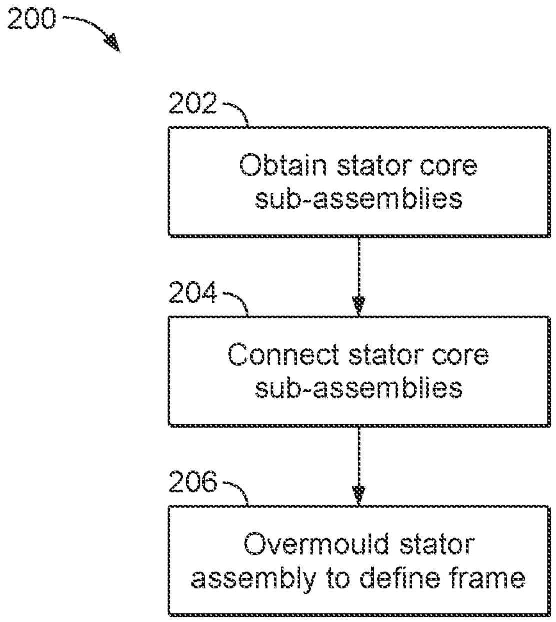
FIG. 12 is a flow diagram illustrating a first method of manufacturing a brushless permanent magnet motor.

A first method 200 of manufacturing the brushless permanent magnet motor 1 is illustrated in the flow diagram of FIG. 12.

The method 200 comprises obtaining 202 the plurality of stator core sub-assemblies 16, connecting 204 adjacent stator core sub-assemblies 16 to form the stator assembly 10, and overmoulding 206 the stator assembly 10 to define the frame 14 within which the stator assembly 10 is housed.

By overmoulding the stator assembly 10 to define the frame 14, the need for the stator core sub-assemblies 16 to be individually adhered to the frame 14 may be removed, and this may provide a manufacturing process with fewer steps than a manufacturing process in which the stator core sub-assemblies 16 are individually adhered to the frame 14. Overmoulding the frame 14 to the stator assembly 10 may, in some examples, provide increased thermal transfer from the stator core sub-assemblies 16 to the frame 14 compared to embodiments where stator core sub-assemblies 16 are adhered to the frame 14.

Overmoulding the frame 14 to the stator assembly 10 may provide a brushless permanent magnet motor 1 having a greater overall stiffness than, for example, a brushless permanent magnet motor in which the stator core sub-assemblies are individually adhered to the frame. Overmoulding the frame 14 to the stator assembly 10 may also facilitate manufacture of a brushless motor having a generally sealed bearing cartridge compared to, for example, an arrangement where the frame has apertures into which individual stator core sub-assemblies are mounted. A sealed bearing cartridge may inhibit airflow from entering the region of the frame 14 in which the bearings 74,76 are housed in use, which may reduce emissions.

Figure 13:
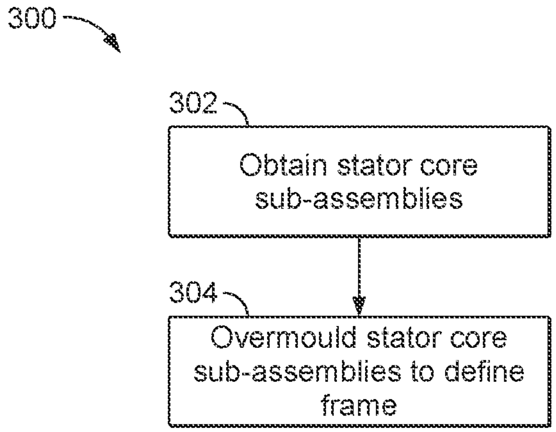
FIG. 13 is a flow diagram illustrating a second method of manufacturing a brushless permanent magnet motor.

A second method 300 of manufacturing the brushless permanent magnet motor 1 is illustrated in the flow diagram of FIG. 13.

The method 300 comprises obtaining 302 the plurality of stator core sub-assemblies 16, and overmoulding 304 the plurality of stator core sub-assemblies 16 to define the frame 14 such that at least a portion of the back 26 and the first 28 and second 30 arms of each stator core 20 is exposed through the frame 14.

As above, by overmoulding the stator core sub-assemblies 16 to define the frame 14, the need for the stator core sub-assemblies 16 to be individually adhered to the frame 14 may be removed, and this may provide a manufacturing process with fewer steps than a manufacturing process in which the stator core sub-assemblies 16 are individually adhered to the frame 14. Overmoulding the frame 14 to the stator core sub-assemblies 16 may, in some examples, provide increased thermal transfer from the stator core sub-assemblies 16 to the frame 14 compared to embodiments where stator core sub-assemblies 16 are adhered to the frame 14.

Overmoulding the frame 14 to the stator core sub-assemblies 16 may provide a brushless permanent magnet motor 1 having a greater overall stiffness than, for example, a brushless permanent magnet motor in which the stator core sub-assemblies are individually adhered to the frame.

However, overmoulding of the stator core sub-assemblies 16 may remove the stator core sub-assemblies 16 from a region of airflow through the brushless permanent magnet motor 1 in use, which may result in the stator cores 22 and/or the windings 24 experiencing increased temperatures in use. By overmoulding the frame 14 to stator core sub-assemblies 16 such that at least a portion of the back 26 and the first 28 and second 30 arms of each stator core 22 is exposed through the frame 14, at least a portion of each stator core 22 may be exposed to airflow through the brushless permanent magnet motor 1 in use, which may provide a cooling effect, thereby reducing any increases in temperature experienced as a result of the overmoulding of the stator core sub-assemblies 16.

Figure 14:
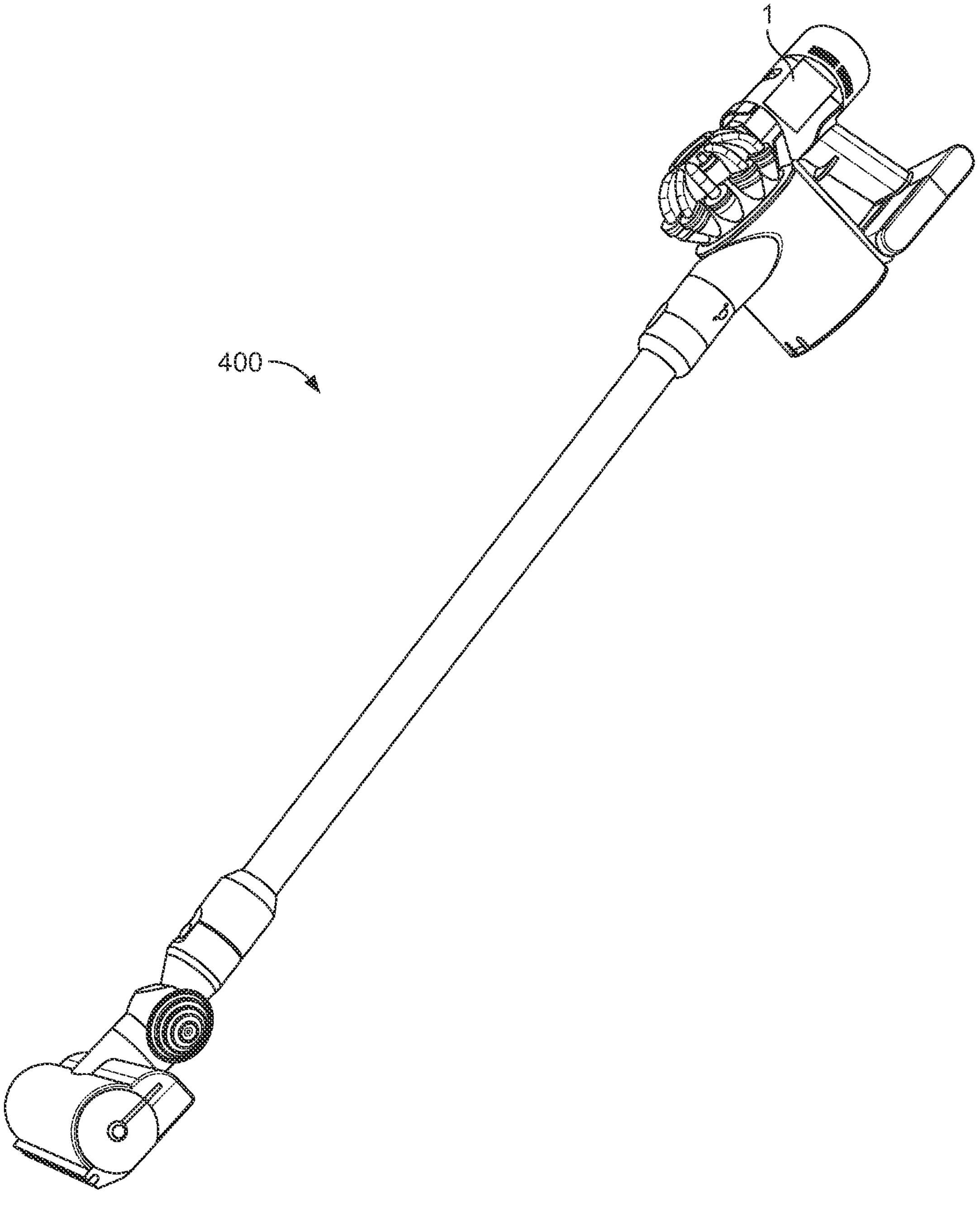
FIG. 14 is a schematic perspective view of a vacuum cleaner incorporating the brushless permanent magnet motor of FIG. 1.

The brushless permanent magnet motor 1 described herein may find particular utility in fields where small factor yet high power density is desirable. As an example, a vacuum cleaner comprising the brushless permanent magnet motor is illustrated schematically in FIG. 14.

Although described herein with a combination of features, it will be appreciated that embodiments of the brushless motor 1 where only some of the above-mentioned features are implemented are also envisaged. For example, the turbulators 112 may still find utility in an arrangement in which the shoulders of the stator cores 22 are not exposed by the frame 14.

The invention claimed is:

1. A brushless motor comprising a stator assembly, a rotor assembly rotatable relative to the stator assembly, and a frame within which the stator assembly and the rotor assembly are housed, wherein the rotor assembly comprises a shaft, first and second bearings attached to the shaft, a permanent magnet attached to the shaft between the first and second bearings, an impeller attached to the shaft, the first bearing located further away from the impeller than the second bearing, and an o-ring mounted between the first bearing and the frame.

2. The brushless motor as claimed in claim 1, wherein the o-ring is mounted between the first bearing and the frame such that the o-ring is able to move axially relative to the frame without deformation of the o-ring.

3. The brushless motor as claimed in claim 1, wherein the o-ring is mounted between the first bearing and the frame such that the o-ring is substantially uncompressed.

4. The brushless motor as claimed in claim 1, wherein the o-ring comprises a substantially circular cross-sectional shape when mounted between the first bearing and the frame.

5. The brushless motor as claimed in claim 1, wherein the o-ring comprises a radial stiffness in the region of $1.0\times10^6$ N/m to $4.0\times10^6$ N/m.

6. The brushless motor as claimed in claim 1, wherein the o-ring comprises a material having a Shore A hardness in the region of 65-90.

7. The brushless motor as claimed in claim 1, wherein the o-ring contacts an outer surface of the first bearing over a region that is substantially smooth, and the o-ring is able to move axially over the region of the outer surface.

8. The brushless motor as claimed in claim 1 wherein the o-ring contacts the frame over a region that is substantially smooth, and the o-ring is able to move axially over the region of the frame.

9. The brushless motor as claimed in claim 1, wherein the frame comprises a channel having a first portion with a first diameter, a second portion with a second diameter less than the first diameter, and a step defining a transition from the first portion to the second portion, the step defining an axial stop for inhibiting axial movement of the o-ring.

10. The brushless motor as claimed in claim 9, wherein the step defines an axial stop for inhibiting axial movement of the o-ring in a direction toward the impeller.

11. The brushless motor as claimed in claim 1, wherein the rotor assembly comprises a pre-load spring for applying a load to an outer race of the first bearing.

12. The brushless motor as claimed in claim 1, wherein the brushless motor comprises a stopper for inhibiting radial motion of the rotor assembly relative to the frame.

13. The brushless motor as claimed in claim 12, wherein the stopper comprises an end cap positioned to at least partially overlie the first bearing, and at least a portion of the end cap is located between the first bearing and the frame.

14. The brushless motor as claimed in claim 13, wherein a first distance between the portion of the end cap located between the first bearing and the frame is less than a second distance between the permanent magnet and the stator assembly.

15. The brushless motor as claimed in claim 14, wherein the end cap comprises a main body and a finger extending from the main body, the finger located between the first bearing and the frame, and wherein the finger is resiliently deformable relative to the main body.

16. The brushless motor as claimed in claim 14, wherein the end cap comprises a main body and a finger extending from the main body, the finger located between the first bearing and the frame, and wherein the end cap comprises a plurality of fingers extending from the main body, the plurality of fingers located between the first bearing and the frame.

17. The brushless motor as claimed in claim 16, wherein the plurality of fingers are evenly spaced about a periphery of the end cap.

18. The brushless motor as claimed in claim 17, wherein each of the plurality of fingers is resiliently deformable relative to the main body.

19. A vacuum cleaner comprising the brushless motor as claimed in claim 1.

20. A brushless motor comprising a stator assembly, a rotor assembly rotatable relative to the stator assembly, and a frame within which the stator assembly and the rotor assembly are housed, wherein the rotor assembly comprises a shaft, first and second bearings attached to the shaft, a permanent magnet attached to the shaft between the first and second bearings, an impeller attached to the shaft, the first bearing located further away from the impeller than the second bearing, and an o-ring mounted between the first bearing and the frame, wherein the o-ring comprises a thermal conductivity of at least 3 W/mK.

21. A brushless motor comprising a stator assembly, a rotor assembly rotatable relative to the stator assembly, and a frame within which the stator assembly and the rotor assembly are housed, wherein the rotor assembly comprises a shaft, first and second bearings attached to the shaft, a permanent magnet attached to the shaft between the first and second bearings, an impeller attached to the shaft, the first bearing located further away from the impeller than the second bearing, and an o-ring mounted between the first bearing and the frame, wherein the brushless motor comprises a stopper for inhibiting radial motion of the rotor assembly relative to the frame;

wherein the stopper comprises an end cap positioned to at least partially overlie the first bearing, and at least a portion of the end cap is located between the first bearing and the frame;

wherein the end cap comprises a main body and a finger extending from the main body, the finger located between the first bearing and the frame.

* * * * *